US 9,178,879 B2

(12) United States Patent
Baliga

(10) Patent No.: US 9,178,879 B2
(45) Date of Patent: Nov. 3, 2015

(54) DEVICE-BASED AUTHENTICATION FOR SECURE ONLINE ACCESS

(75) Inventor: Arati Baliga, Edison, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 160 days.

(21) Appl. No.: 13/462,913

(22) Filed: May 3, 2012

(65) Prior Publication Data

US 2013/0298197 A1 Nov. 7, 2013

(51) Int. Cl.
H04L 29/06 (2006.01)
H04W 12/12 (2009.01)
G06F 21/34 (2013.01)
G06F 21/43 (2013.01)

(52) U.S. Cl.
CPC ............ H04L 63/0876 (2013.01); G06F 21/34 (2013.01); G06F 21/43 (2013.01); H04L 29/06884 (2013.01); H04L 29/06911 (2013.01); H04L 63/126 (2013.01); H04W 12/12 (2013.01); G06F 2221/2153 (2013.01); H04L 29/06823 (2013.01); H04L 63/1466 (2013.01)

(58) Field of Classification Search
CPC . G06F 21/44; H04L 63/1483; H04L 63/0876; H04L 63/0892; H04L 9/321; H04L 59/06755; H04L 29/06823–29/06836; H04L 29/06877; H04L 29/06884; H04L 29/06897; H04L 29/06911; H04L 29/06938; H04W 12/00; H04W 12/06; H04W 12/12
See application file for complete search history.

(56) References Cited

U.S. PATENT DOCUMENTS

| | | | | |
|---|---|---|---|---|
| 7,748,047 | B2 * | 6/2010 | O'Neill | 726/29 |
| 8,151,327 | B2 * | 4/2012 | Eisen | 726/5 |
| 8,387,155 | B2 * | 2/2013 | Gregg et al. | 726/29 |
| 2004/0213172 | A1 * | 10/2004 | Myers et al. | 370/313 |
| 2009/0292814 | A1 * | 11/2009 | Ting et al. | 709/229 |
| 2011/0004764 | A1 * | 1/2011 | Stuber | 713/176 |
| 2011/0086616 | A1 * | 4/2011 | Brand et al. | 455/411 |
| 2011/0244857 | A1 | 10/2011 | Hsieh et al. | |
| 2011/0258434 | A1 * | 10/2011 | Qiu et al. | 713/153 |

* cited by examiner

Primary Examiner — Ashok Patel
Assistant Examiner — Daniel Potratz
(74) Attorney, Agent, or Firm — Hartman & Citrin LLC

(57) ABSTRACT

Methods, systems, and computer-readable media for providing device-based authentication for secure online access are provided. An authentication request is received from an online service. The authentication request may be associated with a login request received by the online service from a user. The authentication request may further indicate a list of device identifiers for computing devices connected to a provider network and previously designated by the user as authorized to access the online service. Communication logs collected from the provider network are analyzed to determine whether the login request originated from one of the authorized computing devices based on the list of device identifiers. If it is determined that the login request originated from one of the authorized computing devices, an indication is returned to the online service that the login request was received from an authorized computing device.

14 Claims, 3 Drawing Sheets

DEVICE-BASED AUTHENTICATION FOR SECURE ONLINE ACCESS

TECHNICAL FIELD

This disclosure relates generally to the field of online authentication. More specifically, the disclosure provided herein relates to strategies for providing device-based authentication for online services.

BACKGROUND

Online service providers often rely on user names and passwords for authenticating users of their online services. The drawback of a simple user name/password scheme is that once a user's credentials have been compromised, an attacker can utilize these credentials to log into the user's account(s) from any location anywhere in the world using any device. Providers of critical online services, such as online banking, might impose additional authentication means or steps for added security. For example, the online service provider may require complex passwords and/or ensure that passwords are changed frequently.

Additionally or alternatively, the online service provider may send a one-time code to another device of the user, such as a mobile phone via short message service ("SMS") text message, or provide a security token that provides a code that is valid in a specific time window in which the user must enter the code in addition to the user name and password to log into the service. However, these schemes may still be susceptible to man-in-the-middle attacks where the one-time code is stolen in addition to the user name and password and relayed to the attacker in real time, facilitating the attacker to log into the online service within that time window.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for providing device-based authentication for secure online access. According to aspects, upon receiving a login request from a user, an online service sends an authentication request to a device-based authentication module. The authentication request may indicate a list of device identifiers for computing devices connected to a provider network and previously designated by the user as authorized to access the online service. The device-based authentication module analyzes communication logs collected from the provider network to determine whether the login request originated from one of the authorized computing devices based on the list of device identifiers. If it is determined that the login request originated from one of the authorized computing devices, the device-based authentication module returns an indication to the online service that the login request was received from an authorized computing device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
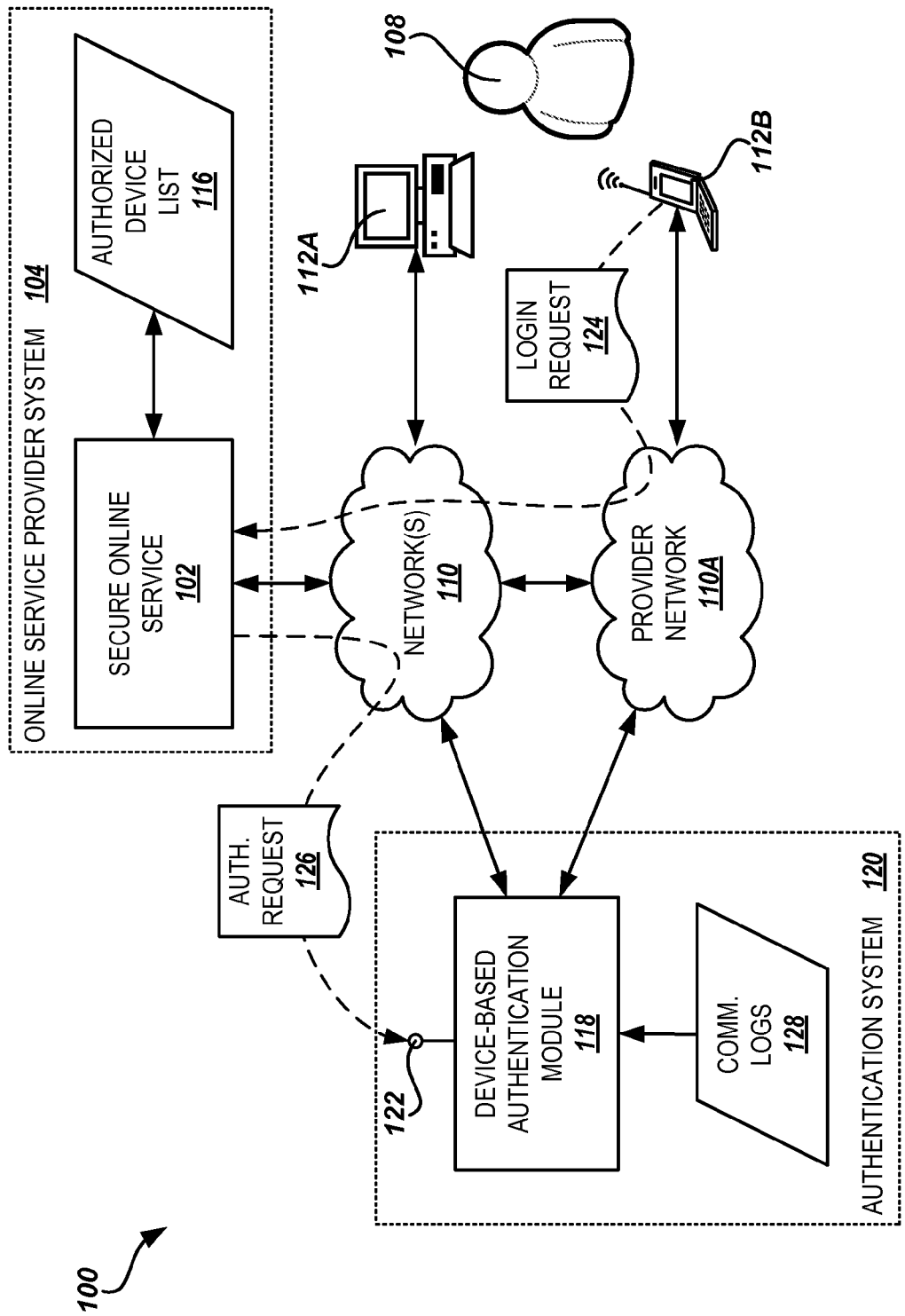
FIG. 1 is a block diagram illustrating an operating environment for providing device-based authentication for secure online access, according to embodiments.

The following detailed description is directed to methods, systems, and computer-readable media for providing device-based authentication for secure online access. Utilizing the technologies described herein, a user may designate one or more specific devices as authorized to access a secure online service. The devices may operate within a communications network provided by a network provider, such as a mobility carrier, a wireless internet service provider, a metropolitan area network ("MAN") provider, or the like. When the user logs into the online service, the online service provider system may send an authentication request to an authentication system implemented by the network provider or a trusted third-party authentication provider, which in turn verifies that the login request originated from one of the designated, authorized devices.

The device-based authentication solutions described herein may provide extra protection for users of secure online services, such as banking services, without requiring the user to carry additional devices, such as security tokens, or to install additional software on their devices, such as soft tokens. In addition, if the user's credentials are compromised, the user is still protected from access to their online service account by a remote attacker. The network provider may also be provided with an additional fee-based product to offer to users and/or online service providers.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments.

Referring now to FIG. 1, an illustrative operating environment 100 and several software components for providing device-based authentication for secure online access is shown, according to embodiments. The operating environment 100 includes a secure online service 102 implemented by an online service provider system 104. The secure online service 102 may comprise one or more software modules executing on application servers and/or other components of the online service provider system 104, for example. The secure online service 102 may provide online services to users, such as the user 108. For example, a bank may provide online banking services to account holders over the Internet. The user 108 may utilize one or more computing devices 112A, 112B (referred to herein generally as computing devices 112) to access the secure online service 102 through one or more networks 110. The computing devices 112 may include personal computers ("PCs"), desktop workstations, laptops, netbooks, personal digital assistants ("PDAs"), mobile phones, tablet devices, and the like. The network(s) 110 may include local-area networks ("LANs"), wide-area networks ("WANs"), mobile carrier networks, the Internet, and/or any other networking topologies that connect the computing devices 112 of the user 108 to the online service provider system 104.

According to embodiments, the network(s) 110 include a provider network 110A. The provider network 110A may be implemented by a network provider at least in part to provide connectivity of specific computing devices of the user 108, such as mobile computing device 112B, to the other network(s) 110. For example, the provider network 110A may provide connectivity between the mobile computing device 112B and the Internet, allowing the user 108 to utilize the mobile computing device to access the secure online service 102. The provider network 110A may be a wireless network, such as a digital cellular network or mobile broadband network, an Internet service provider network, a tier-3 network, or any combination of these and/or other types of networks known in the art in which the network provider 1) may uniquely and securely identify the computing devices 112 connected to the provider network and 2) has visibility into the network traffic originating from the connected devices.

According to further embodiments, the secure online service 102 provides the user 108 with the ability to designate one or more computing devices connected to the provider network 110A, such as the mobile computing device 112B, as authorized to access the secure online service. The secure online service 102 may then restrict the computing devices 112 that are allowed to log into service to those designated by the user 108. For example, the user 108 may utilize the mobile computing device 112B or some other computing device to log into the secure online service 102 and access a Web page provided by the service that allows the user 108 to specify a device identifier for each of the one or more computing devices 112 authorized to access the secure online service 102.

The device identifier of a computing device 112 provided to the secure online service 102 may comprise a hardware identifier for the device, such as an international mobile equipment identity ("IMEI") number, a media access control ("MAC") address, or the like. The device identifier may also comprise an identity of the pairing of the user 108 with the computing device 112, such as an international mobile subscriber identity ("IMSI") number, for example. The device identifier may also comprise a combination of these and other identifiers of the computing device 112 in order to provide an identifier of the device that is more difficult to "spoof." In some embodiments, the device identifier provided to the secure online service 102 comprises a combination of the IMEI and IMSI numbers for the computing device 112.

Other methods of designating the one or more computing devices 112 as authorized to access the secure online service 102 may be envisioned beyond the Web page described above. For example, an application, or "app," executing on the mobile computing device 112B may obtain the device identifier directly from the device and provide the device identifier to the secure online service 102 as part of an "Authorize Device" function of the app. It is intended that all such methods of designating the one or more computing devices 112 as authorized to access the secure online service 102 be included in the scope of this application. The secure online service 102 may store the device identifiers for the authorized computing devices 112 in an authorized device list 116 for the user 108. The authorized device list 116 may be stored in a database, a file system, or some other data storage system in the online service provider system 104, for example.

The operating environment 100 further includes a device-based authentication module 118 executing in an authentication system 120. The device-based authentication module 118 provides device-based authentication services to the secure online service 102 across the network(s) 110. According to some embodiments, the authentication system 120 may be implemented by the network provider associated with the provider network 110A. In other embodiments, the authentication system 120 may be implemented by a trusted entity or third-party authentication provider. The device-based authentication module 118 may comprise any combination of software and/or hardware components in the authentication system 120 implemented in any technology known in the art. For example, the device-based authentication module 118 may comprise a software module executing on one or more application servers in the authentication system 120.

In some embodiments, the device-based authentication module 118 implements an application programming interface ("API") 122 that may be utilized by the secure online service 102 to authenticate that login requests, such as login request 124, originate from an authorized computing device 112 connected to the provider network 110A. The API 122 may comprise a Web service or any other calling interface known in the art that may be accessed by the secure online service 102 across the network(s) 110. As will be described in more detail below in regard to FIG. 2, upon receiving a login request 124 from the user 108, the secure online service 102 may send an authentication request 126 to the API 122 implemented by the device-based authentication module 118.

The authentication request 126 may include data identifying the secure online service 102, an identifier of the user 108 from which the login request was received, and/or a list of the device identifiers for the computing devices 112 designated by the user 108 as authorized to access the secure online service 102. The secure online service 102 may obtain the list of the device identifiers from the authorized device list 116 for the user 108, for example. The authentication request 126 may contain other information to identify the login request 124, the user 108, and/or the authorized computing devices 112 beyond that described herein, such as an IP address of the computing device 112 from which the login request originated, for example.

Upon receiving the authentication request 126, the device-based authentication module 118 may utilize communication logs 128 stored in the authentication system 120 to check that one of the identified authorized computing devices, such as the mobile computing device 112B, is online and that the login request 124 originated from the computing device 112. The communication logs 128 may comprise packet data generated by computing devices 112 connected to the provider network 110A and collected in real time, for example. The communication logs 128 may be stored in a database, one or more data files, or other data storage systems implemented in or available to the authentication system 120, for example. If it is determined that the login request 124 originated from one of the identified authorized computing devices 112 connected to the provider network 110A, the device-based authentication module 118 may then return an indication to the secure online service 102 that the device 112 is authorized.

Figure 2:
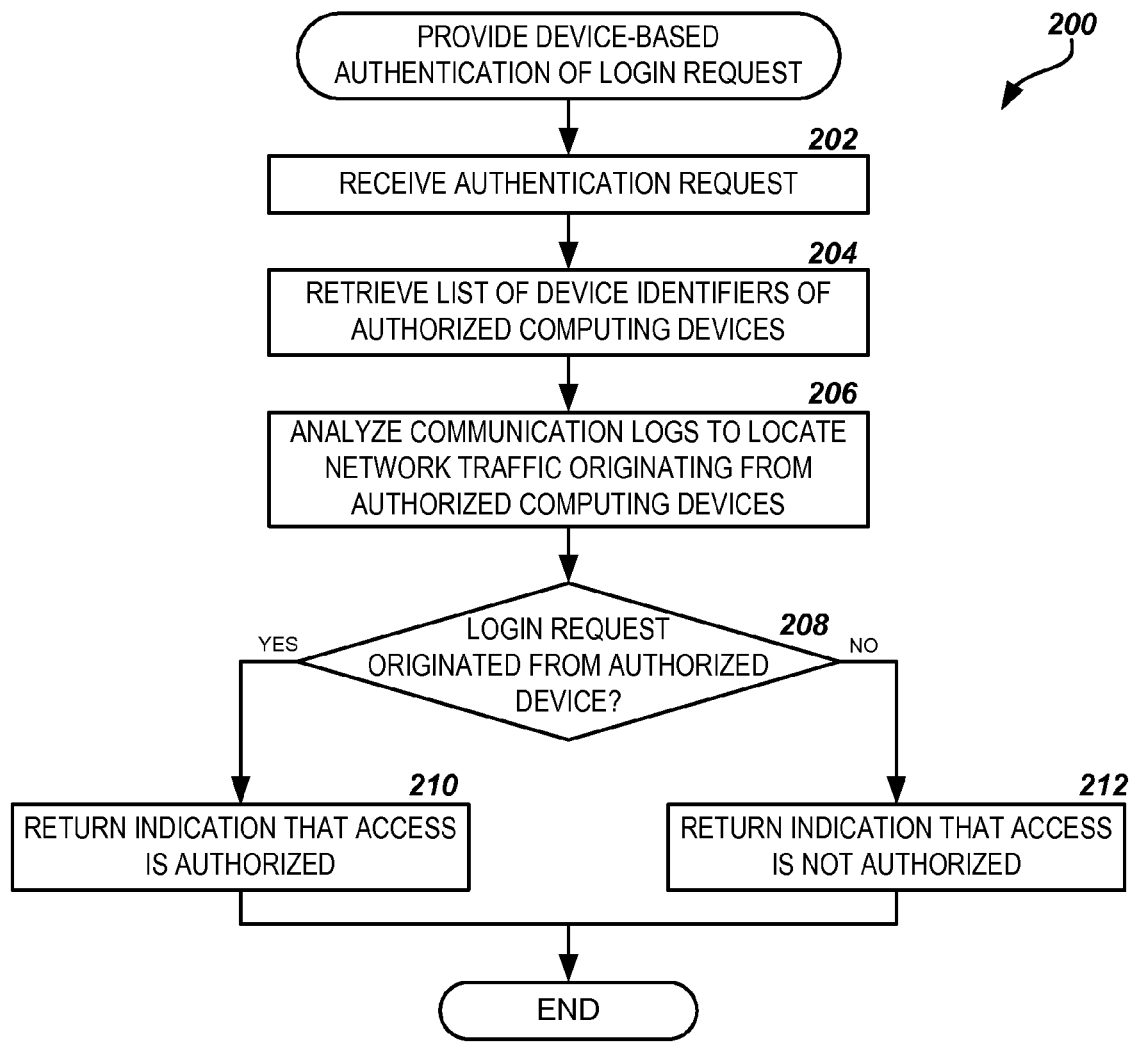
FIG. 2 is a flow diagram illustrating one method for providing device-based authentication for secure online access, according to embodiments.

Referring now to FIG. 2, additional aspects regarding the operation of the software modules and components described above in regard to FIG. 1 will be provided. It should be appreciated that the logical operations described herein are implemented (1) as a sequence of computer implemented acts or program modules executing in a computing system and/or (2) as interconnected machine logic circuits or circuit modules within the computing system. The implementation is a matter of choice and may depend on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

It should also be appreciated that, while the operations are depicted in FIG. 2 as occurring in a sequence, various operations described herein may be performed by different components or modules at different times. In addition, more or fewer operations may be performed than shown, and the operations may be performed in a different order than illustrated in FIG. 2.

FIG. 2 illustrates an example routine 200 for providing device-based authentication for secure online access, according to embodiments. The routine 200 may be performed by the device-based authentication module 118 executing in the authentication system 120. The routine 200 may also be performed by other modules executing in the authentication system 120 or other computing systems, or by a combination of modules and components of various computing systems. The routine 200 begins at operation 202, where the device-based authentication module 118 receives an authentication request 126 from the secure online service 102. According to some embodiments, the authentication request 126 may be received via the API 122 provided by the device-based authentication module 118. As described above, the secure online service 102 may send the authentication request 126 to the device-based authentication module 118 upon receiving a login request 124 from the user 108.

The secure online service 102 may send the authentication request 126 after validating any user credentials provided in the login request 124, or the secure online service 102 may call the device-based authentication module 118 to validate that the login request 124 originated from an authorized computing device 112 before prompting the user 108 for additional credentials, such as a password. As further described above, the authentication request 126 may include data identifying the secure online service 102, such as prearranged ID for the secure online service 102 known by the authentication system 120, an IP address where the login request 124 was received, and/or the like. The authentication request 126 may further include data regarding the associated login request 124, such as user name or user ID of the user 108 from which the login request was received, an IP address or other origin address from which the login request originated, a timestamp indicating when the login request was received, and the like.

From operation 202, the routine 200 proceeds to operation 204 where the device-based authentication module 118 retrieves a list of device identifiers for the computing devices 112 designated by the user 108 as authorized to access the secure online service 102. In some embodiments, the list of device identifiers may be included in the authentication request 126 by the secure online service 102 based on the user 108 from which the associated login request 124 was received. In other embodiments, the secure online service 102 or another module in the online service provider system 104 may periodically send authorized device lists 116 for a number of users 108 to the device-based authentication module 118 for storage in the authentication system 120. Upon receiving an authentication request 126 identifying the secure online service 102 and the user 108 from which the associated login request 124 was received, the device-based authentication module 118 may retrieve the list of device identifiers from the authorized device list 116 for the user stored in the authentication system 120. As discussed above, the device identifier for each of the authorized computing devices 112 may comprise an IMEI number, an IMSI number, a MAC address, or any combination of these and other identifiers of the computing device.

The routine 200 then proceeds from operation 204 to operation 206, where the device-based authentication module 118 analyzes the communication logs 128 collected from the provider network 110A to locate network traffic originating from each of the authorized computing devices connected to the provider network, such as the mobile computing device 112B. As further discussed above, the communication logs 128 may comprise packet data generated by computing devices 112 connected to the provider network 110A and collected in real time. The device-based authentication module 118 may utilize the device identifiers for the authorized computing devices 112, such as a combination of the IMEI and IMSI numbers described above, to locate recent network packet data originating from the devices.

Next, the routine 200 proceeds from operation 206 to operation 208, where the device-based authentication module 118 uses the located network packet data to determine if the login request 124 associated with the received authentication request 126 originated from one of the authorized computing devices 112 connected to the provider network 110A. In some embodiments, the device-based authentication module 118 may parse the recent network packet data originating from the authorized computing devices 112 located in the communication logs 128 to determine if one of the authorized devices is currently connected to the provider network 110A and has network traffic directed to the secure online service 102 that substantially coincides with the related login request 124, i.e. within a certain temporal proximity of the time that the authentication request 126 was received by the device-based authentication module 118 and/or the time that the login request was received by the secure online service.

In further embodiments, the device-based authentication module 118 may use additional information provided in the authentication request 126 to verify the origin of the associated login request 124. For example, the IP address from which the login request 124 was received may be included in the authentication request 126, and the device-based authentication module 118 may further verify that the authorized computing device 112 that has transmitted data to the secure online service 102 is currently assigned the specified IP address. It will be appreciated by one skilled in the art that other methods of utilizing the communication logs 128 and the information included in the authentication request 126 to determine if the associated login request 124 originated from one of the authorized computing devices 112 connected to the provider network 110A may be imagined beyond those described above, and it is intended that all such methods be included in the scope of this application.

If the device-based authentication module 118 determines that the login request 124 associated with the received authentication request 126 originated from one of the authorized computing devices 112, then the routine 200 proceeds from operation 208 to operation 210, where the device-based authentication module 118 returns an indication to the secure online service 102 that the device from which the login request 124 was received is authorized. If the device-based authentication module 118 cannot locate an authorized computing device 112 connected to the provider network 110A from which the login request 124 may have originated, the routine 200 proceeds from operation 208 to operation 212, where the device-based authentication module 118 returns an indication to the secure online service 102 that the device from which the login request 124 was received is not authorized. From operation 210 or 212, the routine 200 ends.

In further embodiments, the login request 124 may be generated by an app executing on a computing device 112 that has access to the device identifier(s), such as the IMEI and/or IMSI numbers of the device. The app may further include the device identifier information along with user credentials for the user 108 in the login request 124. Upon receiving the login request 124, the secure online service 102 may send the device identifier along with the authentication request 126 to the appropriate device-based authentication module 118. The device identifier serves to identify the computing device 112 that the user 108 claims to be using. If this device identifier is stolen and used from a different computing device 112, the device-based authentication module 118 may distinguish the requests based on the communication logs 128.

Figure 3:
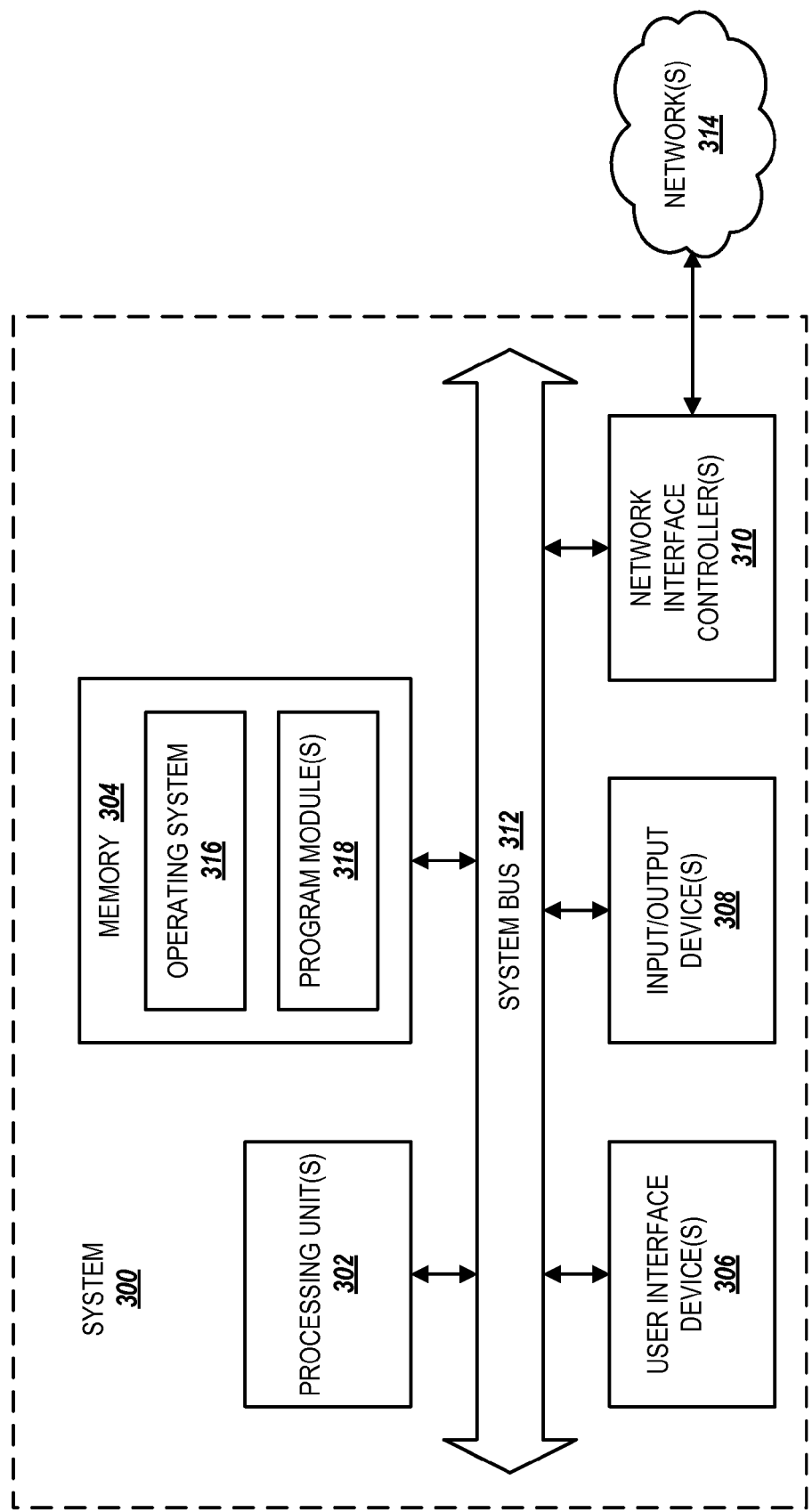
FIG. 3 is a block diagram showing an illustrative computer hardware and software architecture for a computing system capable of implementing aspects of the embodiments presented herein.

FIG. 3 is a block diagram illustrating a computer system 300 configured to provide device-based authentication for secure online access, in accordance with the embodiments described herein. Such a computer system 300 may be utilized to execute the device-based authentication module 118 described above in regard to FIG. 1. The computer system 300 includes a processing unit 302, a memory 304, one or more user interface devices 306, one or more input/output ("I/O") devices 308, and one or more network interface controllers 310, each of which is operatively connected to a system bus 312. The bus 312 enables bi-directional communication between the processing unit 302, the memory 304, the user interface devices 306, the I/O devices 308, and the network interface controllers 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to embodiments. Examples of operating systems, such as the operating system 316, include, but are not limited to, WINDOWS®, WINDOWS® CE, and WINDOWS MOBILE® from MICROSOFT CORPORATION, LINUX, SYMBIAN™ from SYMBIAN SOFTWARE LTD., BREW® from QUALCOMM INCORPORATED, MAC OS® from APPLE INC., and FREEBSD operating system. An example of the program modules 318 includes the device-based authentication module 118 described above in regard to FIG. 1. In one embodiment, the program modules 318 are embodied in computer-readable media containing instructions that, when executed by the processing unit 302, performs the routine 200 for providing device-based authentication for secure online access, as described in greater detail above in regard to FIG. 2. According to further embodiments, the program modules 318 may be embodied in hardware, software, firmware, or any combination thereof.

By way of example, and not limitation, computer-readable media may comprise computer storage media and communication media. Communication media includes signals. Computer storage media includes volatile and non-volatile, removable and non-removable media implemented in any method or technology for the non-transitory storage of information such as computer-executable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information in a non-transitory fashion and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a touch screen, a keyboard, a mouse, or an electronic stylus. Further, the I/O devices 308 may include one or more output devices, such as, but not limited to, a display screen or a printer.

The network interface controllers 310 enable the computer system 300 to communicate with other networks or remote systems via a network 314. Examples of the network interface controllers 310 may include, but are not limited to, a modem, a radio frequency ("RF") or infrared ("IR") transceiver, a telephonic interface, a bridge, a router, or a network card. The network 314 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 314 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). It will be appreciated that the computer system 300 may not include all of the components shown in FIG. 3, may include other components that are not explicitly shown in FIG. 3, or may utilize an architecture completely different than that shown in FIG. 3.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:
   storing, by a processor that executes a device-based authentication module, an authorized device list comprising a hardware identifier associated with a user device, wherein the hardware identifier is received with a login request received from the user device via a network;

receiving, via an application programming interface and at the processor, an authentication request from a service provider system associated with an online service, the authentication request being associated with the login request and being received by the service provider system, wherein the authentication request comprises the hardware identifier, and wherein the service provider system is remote from the processor on the network;

determining, by the processor and based upon the authorized device list, that if the authorized device list comprises the hardware identifier; and in response to a determination that the authorized device list comprises the hardware identifier:

analyzing, by the processor, a communication log associated with the user device, wherein the communication log is collected from a provider network and represents network traffic of the user device on the provider network, determining, by the processor and based upon the communication log, that the login request originated from the user device by determining that the user device is currently connected to the provider network and that the network traffic of the user device on the provider network is directed to the service provider system, and returning, by the processor and in response to the determination that the login request originated from the user device, an indication to the service provider system that the login request is authorized.

2. The method of claim 1, wherein the hardware identifier comprises a media access control address associated with the user device.

3. The method of claim 2, wherein the hardware identifier comprises an international mobile equipment identity associated with the user device.

4. The method of claim 1, wherein the communication log comprises packet data generated by the user device.

5. The method of claim 1, wherein the hardware identifier comprises an international mobile subscriber identity of the user device.

6. A system comprising:

a processor that executes a device-based authentication module; and a memory that stores instructions that, when executed by the processor, cause the processor to perform operations comprising:

storing an authorized device list comprising a hardware identifier associated with a user device, wherein the hardware identifier is received with a login request received from the user device via a network, receiving, via an application programming interface and at the processor, an authentication request from a service provider system associated with an online service, the authentication request being associated with the login request and being received by the service provider system, wherein the authentication request comprises the hardware identifier, and wherein the service provider system is remote from the processor on the network, determining, based upon the authorized device list, that the authorized device list comprises the hardware identifier, and in response to a determination that the authorized device list comprises the hardware identifier:

analyzing a communication log associated with the user device, wherein the communication log is collected from a provider network and represents network traffic of the user device on the provider network, determining, based upon the communication log, that the login request originated from the user device by determining that the user device is currently connected to the provider network and that the network traffic of the user device on the provider network is directed to the service provider system, and returning, in response to the determination that the login request originated from the user device, an indication to the service provider system that the login request is authorized.

7. The system of claim 6, wherein the hardware identifier comprises a media access control address associated with the user device.

8. The system of claim 7, wherein the hardware identifier comprises an international mobile equipment identity associated with the user device.

9. The system of claim 6, wherein the communication log comprises packet data generated by the user device.

10. The system of claim 6, wherein the hardware identifier comprises an international mobile subscriber identity of the user.

11. A non-transitory computer storage medium having computer-executable instructions stored thereupon that, when executed in a computer system, cause the computer system to perform operations comprising:

storing, by a processor that executes a device-based authentication module, an authorized device list comprising a hardware identifier associated with a user device, wherein the hardware identifier is received with a login request received from the user device via a network;

receiving, via an application programming interface and at the processor, an authentication request from a service provider system associated with an online service, the authentication request being associated with the login request and being received by the service provider system, wherein the authentication request comprises the hardware identifier, and wherein the service provider system is remote from the processor on the network;

determining, by the processor and based upon the authorized device list, that the authorized device list comprises the hardware identifier; and in response to a determination that the authorized device list comprises the hardware identifier:

analyzing, by the processor, a communication log associated with the user device, wherein the communication log is collected from a provider network and represents network traffic of the user device on the provider network, determining, by the processor and based upon the communication log, that the login request originated from the user device by determining that the user device is currently connected to the provider network and that the network traffic of the user device on the provider network is directed to the service provider system, and returning, by the processor and in response to the determination that the login request originated from the user device, an indication to the service provider system that the login request is authorized.

12. The non-transitory computer storage medium of claim 11, wherein the hardware identifier comprises an international mobile equipment identity associated with the user device.

13. The non-transitory computer storage medium of claim 12, wherein the hardware identifier comprises a media access control address associated with the user device.

14. The non-transitory computer storage medium of claim 11, wherein the hardware identifier comprises an international mobile subscriber identity of the user device.

* * * * *